March 2, 1954  F. D. BARBER  2,670,998
LUBRICANT RESERVOIR FOR RAILWAY CAR JOURNAL BEARINGS
Filed June 28, 1950  2 Sheets-Sheet 2
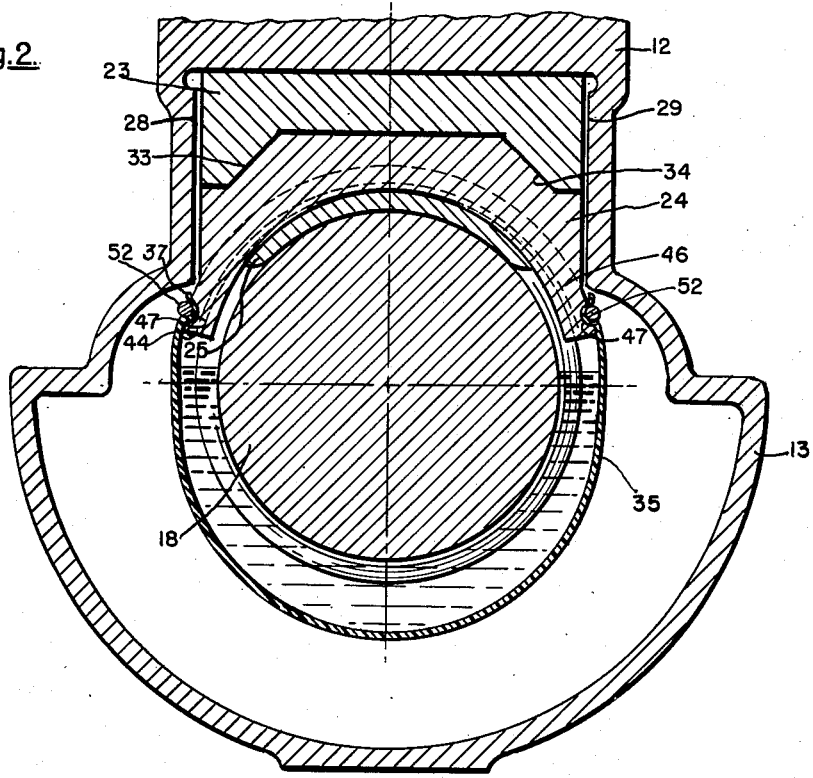
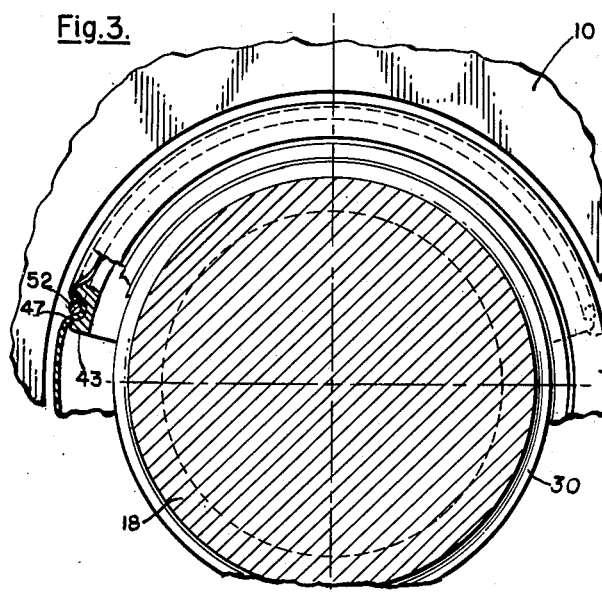
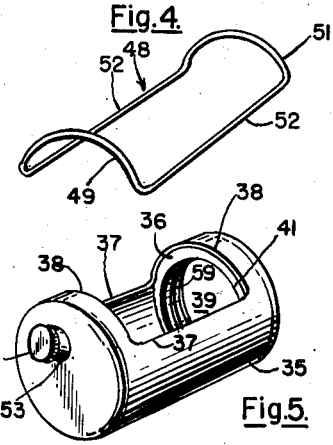
INVENTOR
Franklin D. Barber
BY Harvey M. Gillespie
ATTORNEY Patented Mar. 2, 1954

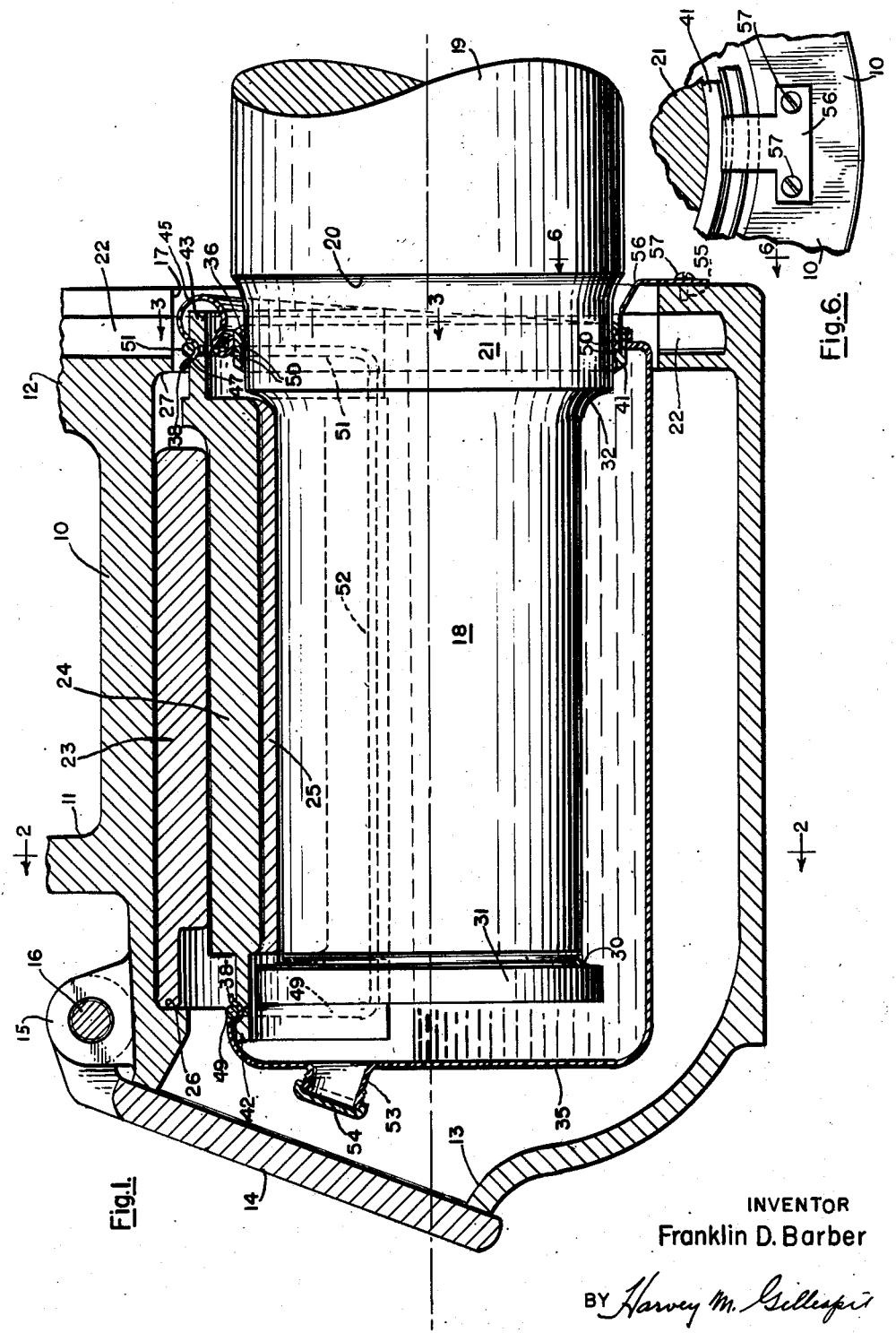

2,670,998

UNITED STATES PATENT OFFICE 2,670,998

LUBRICANT RESERVOIR FOR RAILWAY CAR JOURNAL BEARINGS

Franklin D. Barber, Flossmoor, Ill., assignor to Standard Car Truck Company, Chicago, Ill., a corporation of New Jersey Application June 28, 1950, Serial No. 170,919

7 Claims. (Cl. 308—83)

This invention relates generally to improvements in railway car trucks and more particularly to improvements in devices for applying lubricant to the journal bearings of a railway car truck.

The lubrication of railway car journal bearings has heretofore been a considerable problem in railway operation. The usual method of lubrication has entailed the use of oil-soaked waste which is packed into journal boxes in such a fashion that the oil-soaked waste makes contact with the underside of the journal, whereby the lubricant brought into contact with the journal by wick action is carried by the rotation of the journal into contact with the bearing element which normally seats on the upper portion of the journal. Attempts have been made to improve car journal lubrication, and pads or other lubricant supplying devices have been used instead of waste. Such lubricant supplying devices have not been entirely satisfactory, and therefore the development of "hot boxes" the cause of expensive damage to the journals and the journal bearings, as well as annoying delays, have not been entirely avoided by their use.

Hot boxes may result from many causes including strands of packing waste drawn between the journal and the journal bearing by the rotation of the journal or by abrasives carried by the lubricant into contact with the co-engaging surfaces of the journal and its associate bearing element. The conventional journal box ordinarily is closed against the entrance of abrasives material by providing the journal box with a dust guard slot for holding a dust guard or shield made of wood or fiber, the dust shield contacting the dust guard bearing of the journal, thereby both excluding dust and preventing the escape of oil and waste from the journal box. However, the use of such dust shields entails the use of a number of associated parts, all of which require constant inspection and frequent repair to maintain them in proper order to exclude dust ladened air from entering the journal box.

With the foregoing considerations in mind, it is a principal object of the invention to provide a construction which may be readily and conveniently inserted within a conventional journal box to provide a lubricant reservoir adapted to supply the journal and its associated bearing with lubricant at all times, which reservoir will be completely sealed against the ingress of dirt and foreign material under all operating conditions.

Another object is to afford a simple and efficient lubricant retaining reservoir which can be suspended from the journal bearing or brass, and which will maintain lubricant in contact with the axle journal at all times.

Still another object is to provide a seal for the dust guard bearing of the axle journal, which will make the conventional dust guard unnecessary, and which will also perform the function of preventing the escape of lubricant around the dust guard bearing.

Other objects and important features of the invention will be apparent from the following description taken together with the drawings which show a preferred embodiment of the invention and what is now considered to be the best mode of applying the principles thereof. While the invention is described in terms of what is now considered to be a preferred embodiment thereof, its scope is not intended to be limited by the embodiment shown nor otherwise than by the terms of the claims subjoined.

Heretofore, various lubricant reservoirs have been proposed for use, but these proposals have ordinarily contemplated rigid structure, usually metallic structures of special design which cannot be readily inserted in a journal box without first dismantling the journal bearing elements. This, of course, entails considerable labor. Furthermore, additional labor and difficulties are encountered when it is necessary to renew the journal bearings.

According to the present invention, the reservoir is formed of flexible material which will yield to facilitate its insertion into the interior of the journal box. The flexible reservoir may be attached to the journal bearing, either before or after the bearing is in position. However, by reason of the flexible character of the reservoir it may be, and preferably is, removably attached to the journal bearing and slipped over the journal, simultaneously with the application of the journal bearing to its operative position on the journal.

A spring clip element is shown herein as one suitable means for attaching the flexible reservoir to the journal bearing, but other suitable means may be provided within the scope of this invention. The journal bearing is preferably modified slightly to accommodate the spring clip element shown, but such modification or the extent thereof will be determined by the specific means used for attaching the reservoir to the journal bearing or otherwise supporting it within the journal box. The invention therefore contemplates, within its broad scope, the provision of various arrangements and constructions for supporting the reservoir within the journal box.

The inner portion of the reservoir includes means for surrounding and bearing in sealing contact against the dust guard bearing formed on conventional axles. The connection between the last mentioned sealing element and the lubricant reservoir is preferably such as to accommodate the usual vertical movements of the bearing and the journal when the wheels pass over rail joints at high speed or during sudden jerking and stopping of the car.

In the drawings:

Fig. 1 is a longitudinal cross-section through a conventional journal box of a railway car truck showing the lubricating and dust sealing device according to the present invention, Fig. 2 is a transverse section through the journal box of Fig. 1 taken along the line 2—2 of Fig. 1 and looking in the direction of the arrows;

Fig. 3 is a section taken along the line 3—3 of Fig. 1 looking in the direction of the arrows, and showing details for holding the lubricant reservoir in suspended position on the journal bearing;

Fig. 4 is a reduced in size perspective view of a spring clip for holding the lubricant reservoir in suspended position on the journal bearing or brass;

Fig. 5 is a reduced in size perspective view of a lubricant reservoir and dust seal adapted to be suspended in the journal box shown in Fig. 1; and Fig. 6 is an end view looking in the direction of the arrows 6—6 of Fig. 1 showing details of construction of a locking arm for preventing rotation of the dust seal on the dust guard bearing of the axle journal shown in Fig. 1.

Referring to the drawings, the lubricant reservoir and dust seal according to the present invention is shown supported within a journal box 10 of a railway car truck. The journal box 10 herein shown is of conventional construction and may be formed integrally with side frames 11 and 12 of a truck. An end opening 13 is closed by a journal box lid 14 hinged by bolt 16 to lugs 15 on the top of the journal box 10.

The journal box 10 herein shown is also provided with a circular opening 17 for receiving a journal 18 of a wheel axle 19. A dust guard bearing 21 formed between shoulders 32 and 20 and the axle has been heretofore fitted with a dust guard, not shown, the guard being inserted in a slot 22 formed in the journal box 10.

The load on the side frames 11 and 12 is distributed by a wedge 23 onto a journal bearing or "brass" 24 having an integral liner 25 which rests on top of the journal 18. As shown also with reference to Figs. 1 and 2 the wedge 23 is positioned between shoulders 26 and 27 of the journal box 10 and between vertical sides 28 and 29 thereof.

The bearing brass 24 is limited in its endwise movement on the journal 18 between a collar 31 formed on the outer end of the journal 18 and a shoulder 32 formed between the journal 18 and the dust guard bearing 21. The brass 24 is also held in position between the wedge 24 and journal 18 by wedge surfaces 33 formed on the wedge 23 and mating wedge surfaces 34 formed on the brass 24.

As has been explained above, the journals and journal boxes of the prior art have been lubricated by packing the bottom of the journal box with oil-soaked waste which contacted the underside of the journal so that the rotating journal would wipe a film of lubricant from the waste to maintain lubrication between the bearing brass and its liner and the journal. According to the present invention, an adequate and contaminant free supply of lubricant is maintained against the journal to the end that the journal bearing or brass will at all times be supplied with proper and adequate lubricant.

Accordingly, the brass 24 may be employed as a support for a flexible lubricant reservoir or housing, indicated generally at 35. The lubricant reservoir 35 is generally cylindrical in form as seen particularly with reference to Fig. 5 and may be considered as enclosed by continuous flexible walls. The upper portion of the reservoir 35 is cut out as shown to define a substantially rectangular opening 36 bounded by sides 37 and end 38. The flexible reservoir 35 is formed from flexible leak-proof material which is resistant to oils and lubricant. One example of a suitable material is neoprene or a neoprene impregnated fabric. However, the invention contemplates any material suitable for use.

The flexible reservoir 35 is provided with an end opening 39 which is fitted with a seal 41. The seal 41, see Fig. 1, includes a series of grooves 50 and fits against the dust guard bearing 21 to form a tight seal against the ingress of dirt or foreign material from without the journal box 10 and also against the leakage of lubricant from within the reservoir 35.

Means are provided for suspending the reservoir 35 from the brass 24 and for holding the reservoir 35 in place thereon around the journal 18. To this end the brass 24 is provided with arcuate end flanges 42 and 43 which are spaced respectively from the collar 31 and the dust guard bearing 21. The arcuate flanges 42 and 43 are integral with flange portions 44 and 46 of the brass 24 which extend axially of the journal 18 and spaced therefrom. The flanges 42 and 43 and the flange portions 44 and 46 are formed with a continuous groove 47 which is substantially rectangular in form. A snap ring 48, see Fig. 4, is adapted to overlie the groove 47 with the sides 37 and ends 38 of the opening 36 of the reservoir engaged therebetween. The snap ring 48 is substantially rectangular in shape and has an arcuate end portion 49 conforming to the arc radius of the groove 47 in the arcuate end flange 42, and has an arcuate end portion 51 conforming to the arc radius of the groove 47 in the arcuate end flange 43. The snap ring 49 is provided with straight side portions 52 which conform to and nest in the portion of the groove 47 formed in the flange portions 44 and 46.

The snap ring 48 is made of resilient metal and is preferably formed in such a fashion that when the ends 38 and sides 37 of the opening 36 of the reservoir 35 are brought over the arcuate flanges 42 and 43 and over the flange portions 44 and 46, the snap ring will hold the ends and sides of the opening 36 in the groove 47 with a snap action, thereby holding the reservoir 35 snugly and securely in position on the brass 24.

The reservoir 35 when thus suspended can be filled with lubricant to a level L—L through a threaded ferrule 53 formed in the end of the reservoir 35. The reservoir 35 is then closed by a cap 54 threaded to the ferrule 53.

Means are provided for preventing rotation or twisting of the seal 41 and likewise the flexible reservoir 35 by the rotation of the dust guard bearing 21 of the axle 19. To this end the seal 41 is recessed to receive the end of a clip 56 secured to the journal box by any suitable means or around the opening 17 in the journal box 10 and held by screws 57 threaded to tapped holes 55 in the journal box 10.

The details of construction of the seal 41 form no part of the present invention and other forms of seals may be employed as long as they prevent entrance of foreign material to the reservoir 34 and also prevent leakage of lubricant therefrom. However, the seal 41 employed for purposes of describing the invention herein consists of a ring made of neoprene or other lubricant resisting elastomers provided with alternately spaced lands 58 and grooves 59, the lands 58 of which contact the dust guard bearing 21 and provide a plurality of sealing lips preventing the escape of lubricant from and the ingress of dirt and foreign material to the lubricant reservoir 35.

In assembling the lubricant reservoir and dust seal within the journal box 10, the side frames 11 and 12 are supported with the journal box 10 while the journal bearing or brass 24 is fitted with the reservoir 35 in the manner described above. With the reservoir 35 in position on the brass 24 and held by the snap ring 49, the reservoir 35 and the brass is inserted through the journal box opening 13 and the seal is brought past the journal collar 31 and fitted on the dust guard bearing 21. The wedge 23 is then placed in position atop the brass 24 and between the journal box 10 and the brass 24 in the manner shown. The seal 41 is then held against rotation by the clip 56 which is held to the journal box by the screws 57. The reservoir 35 is then filled with lubricant to the level L—L, or until the journal 18 is in contact with lubricant at some other level and then closed by the cap 54, thus completing the assembly and placing same in operation.

It will be seen from the foregoing description that the invention herein described provides a novel and useful means for lubricating railway car journals and at the same time prevents entrance of dirt to the journal and journal bearing. According to the present invention a conventional and standard railway car journal and journal box can be employed. Since the lubricant reservoir forms its own dust seal, the use of the conventional dust guards, dust guard wedges and caps is made unnecessary.

While the invention has been described in terms of certain preferred embodiments, it is not intended that the invention be limited in terms of the embodiment shown nor otherwise than by the terms of the appended claims.

I claim:

1. The combination with a rotating journal of a railway car axle, a journal bearing supported on said journal, and a journal box enclosing said journal and journal bearing, of means for applying lubricant to said journal and bearing comprising a lubricant retaining reservoir having flexible walls suspended from said journal bearing in a position to enclose a portion of said journal, means for suspending said reservoir by its said flexible walls from said journal bearing comprising flanges formed on said journal bearing and defining a support for said flexible walls, said flanges having an arcuate form and cooperating with resilient retaining means for holding said flexible walls of said reservoir in position between said arcuate flanges and said resilient retaining means, and means for preventing escape of lubricant from said reservoir comprising a seal supported in a wall of said reservoir and surrounding said journal.

2. The combination with a journal of a railway car axle, a journal bearing supported thereon and a journal box enclosing said journal and bearing, of a device for applying lubricant to said journal and bearing comprising a lubricating retaining reservoir having flexible walls adapted to be inserted into the journal box to enclose said journal and to be suspended from said journal bearing, means for suspending said reservoir by said flexible walls from said journal bearing comprising flanges formed on said journal bearing and defining a support for said flexible walls, said flanges having an arcuate form and cooperating with resilient retaining means for holding said flexible walls of said reservoir in position between said arcuate flanges and said resilient retaining means, means for preventing escape of lubricant from said reservoir comprising a seal supported in a wall of said reservoir and surrounding said journal, and means for preventing twisting of said seal and said reservoir upon rotation of said journal comprising an anchor member connecting said seal to said journal box.

3. The combination with a rotating journal of a railway car axle, a journal box therefor and a journal bearing supported within said box on said journal and formed with flanges thereon spaced from the surface of said rotating journal, of means for supplying lubricant to said journal and said bearing comprising a lubricant reservoir formed from flexible material having lubricant resisting qualities and having an opening therein into which said flanges extend for support of said reservoir on said flanges along the sides and ends of said opening and for enclosing said journal in said reservoir with a supply of lubricant against said journal, an opening in a wall of said reservoir for the insertion of said journal into said reservoir, and a seal held in said wall and contacting a portion of said axle for preventing the escape of lubricant from said reservoir and the entrance of foreign material to said reservoir.

4. The combination with a rotating journal of a railway car axle, a journal box therefor and a journal bearing supported within said box on said journal and formed with flanges thereon spaced from the surface of said rotating journal, of means for supplying lubricant to said journal and said bearing comprising a lubricant reservoir formed from flexible material having lubricant resisting qualities and having an opening therein into which said flanges extend for support of said reservoir on said flanges along the sides and ends of said opening and for enclosing said journal in said reservoir with a supply of lubricant against said journal, a resilient clamp for holding said reservoir in clamping engagement with said flange, an opening in a wall of said reservoir for the insertion of said journal into said reservoir, and a seal held in said wall and contacting a portion of said axle for preventing escape of lubricant from said reservoir and the entrance of foreign material thereto.

5. In combination with a rotatable journal of a railway car axle and a journal bearing supported thereon, of a lubricating device for applying oil to said journal and said bearing comprising a lubricant retaining reservoir extending beneath said journal and provided with flexible side and end walls, one of said walls having a circular opening therein, the perimeter of which is arranged in sealing engagement with a portion of the axle at a location inwardly of said journal, and means for removably attaching said walls to the bearing to provide a sealed engagement therewith and to suspend the reservoir therefrom, whereby the said bearing, the reservoir and its engagement with said axle cooperate to provide a wholly sealed enclosure for supporting a body of oil in contact with said journal.

6. A combination structure as defined in claim 5 characterized in that the said reservoir is constructed throughout of flexible material.

7. A combination structure as defined in claim 6 characterized in that the circular opening for engaging a portion of the axle includes flange portions extending laterally of the end wall and formed on its inner surface with a series of circumferential grooves.

FRANKLIN D. BARBER.

References Cited in the file of this patent

UNITED STATES PATENTS

| Number | Name | Date |
|---|---|---|
| 592,910 | Haines | Nov. 2, 1897 |
| 1,766,387 | Knight | June 24, 1930 |
| 1,906,840 | Coady | May 2, 1933 |
| 2,150,935 | Miller | Mar. 21, 1939 |
| 2,534,045 | Massey | Dec. 12, 1950 |